United States Patent
Tayyab et al.

(10) Patent No.: US 12,457,552 B2
(45) Date of Patent: Oct. 28, 2025

(54) NETWORK ENERGY SAVING

(71) Applicant: Nokia Solutions and Networks Oy, Espoo (FI)

(72) Inventors: Muhammad Tayyab, Oulu (FI); Dileep Kumar, Espoo (FI)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 18/958,796

(22) Filed: Nov. 25, 2024

(65) Prior Publication Data

US 2025/0184899 A1    Jun. 5, 2025

(30) Foreign Application Priority Data

Dec. 4, 2023   (FI) ...................................... 20236334

(51) Int. Cl.
  *H04W 52/02*    (2009.01)
(52) U.S. Cl.
  CPC ... *H04W 52/0206* (2013.01); *H04W 52/0235* (2013.01)
(58) Field of Classification Search
  CPC ......... H04W 52/0251; H04W 52/0216; H04W 52/0235; H04W 72/20; Y02D 30/70
  See application file for complete search history.

(56) References Cited

U.S. PATENT DOCUMENTS

| | | | |
|---|---|---|---|
| 10,945,203 B2 | 3/2021 | Guo | |
| 2014/0341102 A1 | 11/2014 | Wentink | |
| 2018/0206193 A1* | 7/2018 | Adachi | H04W 52/0235 |
| 2020/0015166 A1 | 1/2020 | Ahn et al. | |
| 2021/0127293 A1* | 4/2021 | Hong | H04W 28/0278 |
| 2021/0337474 A1* | 10/2021 | Åström | H04W 52/0235 |
| 2023/0077869 A1 | 3/2023 | Ly et al. | |
| 2023/0199649 A1 | 6/2023 | Kwak et al. | |
| 2023/0276450 A1* | 8/2023 | Abdelghaffar | H04L 5/0048 |
| | | | 370/329 |
| 2023/0403649 A1* | 12/2023 | Ahn | H04W 12/69 |
| 2024/0073819 A1* | 2/2024 | Abotabl | H04W 52/028 |

FOREIGN PATENT DOCUMENTS

| | | |
|---|---|---|
| WO | 2023/274371 A1 | 1/2023 |
| WO | 2023/048634 A1 | 3/2023 |
| WO | 2023/066915 A1 | 4/2023 |
| WO | 2023/097343 A2 | 6/2023 |

(Continued)

OTHER PUBLICATIONS

"3rd Generation Partnership Project; Technical Specification Group Radio Access Network; Study on low-power wake up signal and receiver for NR (Release 18)", 3GPP TR 38.869, V0.3.0, Aug. 2023, 37 pages.

(Continued)

*Primary Examiner* — Omer S Mian
(74) *Attorney, Agent, or Firm* — Nokia Technologies Oy

(57) ABSTRACT

Disclosed is a method comprising receiving (203), from at least one terminal device (100) by a wake-up receiver (WURx) of an apparatus (104), at least one enhanced wake-up signal (201), and deciding (204), by the wake-up receiver (WURx), based on the at least one enhanced wake-up signal (201), whether or not to wake-up the apparatus (104) from a network energy saving mode.

9 Claims, 11 Drawing Sheets

(56) References Cited

FOREIGN PATENT DOCUMENTS

Figure 1:
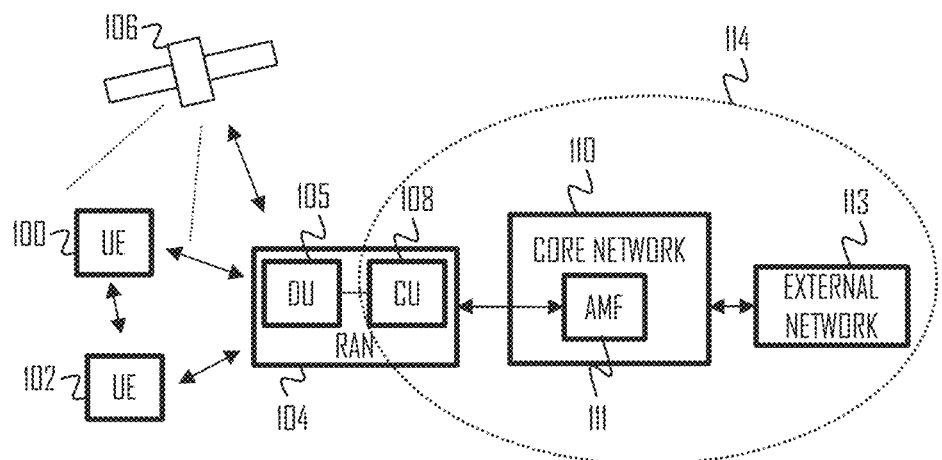

| WO | 2023/102882 A1 | 6/2023 |
|---|---|---|
| WO | 2023/179566 A1 | 9/2023 |
| WO | 2023/211359 A1 | 11/2023 |
| WO | 2023/217087 A1 | 11/2023 |

OTHER PUBLICATIONS

"Revised WID on support of reduced capability NR devices", 3GPP TSG RAN Meeting #91e, RP-210918, Agenda: 9.7.27, Nokia, Mar. 22-26, 2021, 6 pages.

"3rd Generation Partnership Project; Technical Specification Group Radio Access Network; Study on support of reduced capability NR devices (Release 17)", 3GPP TR 38.875, V17.0.0, Mar. 2021, pp. 1-135.

"pCR for TR 38.848 "Study on Ambient IoT (Internet of Things) in RAN"—Topologies", 3GPP TSG RAN Meeting #99, RP-230807, Agenda: 9.2.3, Huawei, Mar. 20-23, 2023, 3 pages.

"pCR for TR 38.848 "Study on Ambient IoT (Internet of Things) in RAN"—RAN#99 decisions", 3GPP TSG RAN Meeting #99, RP-230808, Agenda: 9.2.3, Huawei, Mar. 20-23, 2023, 6 pages.

"Ambient IoT device characteristics and targeted spectrum", 3GPP TSG-RAN #99, RP-230058, Agenda: 9.2.3, Nokia, Mar. 20-23, 2023, 4 pages.

"3rd Generation Partnership Project; Technical Specification Group Radio Access Network; Study on network energy savings for NR (Release 18)", 3GPP TR 38.864, V18.1.0, Mar. 2023, pp. 1-72.

Rubio et al., "Energy-aware broadcast multiuser-MIMO precoder design with imperfect channel and battery knowledge", IEEE Transactions on Wireless Communications, vol. 13, No. 6, Jun. 2014, pp. 3137-3152.

Cui et al., "Power Estimation for Viterbi Decoders", Wireless Systems Lab, 2003, 4 pages.

"3rd Generation Partnership Project; Technical Specification Group Radio Access Network; NR; Radio Resource Control (RRC) protocol specification (Release 17)", 3GPP TS 38.331, V17.5.0, Jun. 2023, pp. 1-1328.

"Revised SI: Study on network energy savings for NR", 3GPP TSG RAN Meeting #95e, RP-220297, Agenda: 9.2.1, Huawei, Mar. 17-23, 2022, 5 pages.

"New WID: Network energy savings for NR", 3GPP TSG RAN Meeting #98-e, RP-223540, Agenda: 9.1.1, Huawei, Dec. 12-16, 2022, pp. 1-6.

"Discussion on network energy saving techniques", 3GPP TSG RAN WG1 #111, R1-2211459, Agenda: 9.7.2, OPPO, Nov. 14-18, 2022, 10 pages.

"Summary #1 for email discussion on energy saving techniques of NW energy saving SI", 3GPP TSG RAN WG1 Meeting #109-e, R1-2205141, Agenda: 9.7.2, Intel Corporation, May 9-20, 2022, 57 pages.

Allai et al., "A new sustainable mechanism to wake-up bast stations in mobile networks", Global Information Infrastructure and Networking Symposium (GIIS), Oct. 19-21, 2016, 6 pages.

"IEEE 802.11", Wikipedia, Retrieved on Dec. 5, 2024, Webpage available at : https://en.wikipedia.org/wiki/IEEE_802.11.

"IEEE 802.15", Wikipedia, Retrieved on Dec. 5, 2024, Webpage available at : https://en.wikipedia.org/wiki/IEEE_802.15.

Office Action received for corresponding Finnish Patent Application No. 20236333, dated May 17, 2024, 11 pages.

"Further enhancements on network energy saving", 3GPP TSG RAN #101, RP-232208, Agenda: 8A.2.5, CMCC, Sep. 11-15, 2023, 10 pages.

Office Action received for corresponding Finnish Patent Application No. 20236334, dated May 24, 2024, 12 pages.

"On LP-WUS in RRC_Connected", 3GPP TSG-RAN WG2 Meeting #124, R2-2313127, Agenda: 7.22.3, Nokia, Nov. 13-17, 2023, 6 pages.

"Discussion on On-demand SIB1", 3GPP TSG RAN WG2 Meeting #126, R2-2405295, Agenda: 8.5.3, Qualcomm Incorporated, May 22-26, 2024, pp. 1-7.

Office Action received for corresponding Finnish Patent Application No. 20236334, dated Nov. 22, 2024, 10 pages.

International Search Report and Written Opinion received for corresponding Patent Cooperation Treaty Application No. PCT/EP2024/083160, dated Jan. 29, 2025, 11 pages.

Extended European Search Report received for corresponding European Patent Application No. 24215717.0, dated Apr. 4, 2025, 10 pages.

\* cited by examiner

NETWORK ENERGY SAVING

RELATED APPLICATION

This application claims benefit of priority from Finnish Patent App. No. 20236334, filed Dec. 4, 2023, the disclosure of which is hereby incorporated in its entirety by reference herein.

FIELD

The following example embodiments relate to wireless communication and network energy saving.

BACKGROUND

A wake-up signal (WUS) for gNB has been proposed to improve network energy saving (NES), where a user equipment transmits an uplink WUS to an access node to request transitioning of a cell from no or reduced transmission/reception activity to active transmission/reception to improve the NES. However, in 6G there are many types of low-complexity and/or low data rate devices, such as RedCap, ambient IoT, cellular IoTs. For such low-priority devices or even for normal devices with low-priority data, waking up the access node may be inefficient from the NES point of view.

BRIEF DESCRIPTION

The scope of protection sought for various example embodiments is set out by the independent claims. The example embodiments and features, if any, described in this specification that do not fall under the scope of the independent claims are to be interpreted as examples useful for understanding various embodiments.

According to an aspect, there is provided an apparatus comprising at least one processor, and at least one memory storing instructions that, when executed by the at least one processor, cause the apparatus at least to:
receive, from at least one terminal device by a wake-up receiver of the apparatus, at least one enhanced wake-up signal; and decide, by the wake-up receiver, based on the at least one enhanced wake-up signal, whether or not to wake-up the apparatus from a network energy saving mode.

According to another aspect, there is provided an apparatus comprising: means for
receiving, from at least one terminal device by a wake-up receiver of the apparatus, at least one enhanced wake-up signal; and deciding, by the wake-up receiver, based on the at least one enhanced wake-up signal, whether or not to wake-up the apparatus from a network energy saving mode.

According to another aspect, there is provided a method comprising:
receiving, from at least one terminal device by a wake-up receiver of an apparatus, at least one enhanced wake-up signal; and deciding, by the wake-up receiver, based on the at least one enhanced wake-up signal, whether or not to wake-up the apparatus from a network energy saving mode.

According to another aspect, there is provided a non-transitory computer readable medium comprising program instructions which, when executed by an apparatus, cause the apparatus to perform at least the following:
receive, from at least one terminal device by a wake-up receiver of the apparatus, at least one enhanced wake-up signal; and decide, by the wake-up receiver, based on the at least one enhanced wake-up signal, whether or not to wake-up the apparatus from a network energy saving mode.

According to another aspect, there is provided a device comprising at least one processor, and at least one memory storing instructions that, when executed by the at least one processor, cause the device at least to:
transmit an enhanced wake-up signal to a wake-up receiver of a network node; and based on the transmitting, set up a timer (T), wherein the timer (T) indicates a time period within which an enhanced wake-up signal response is to be received from the wake-up receiver.

According to another aspect, there is provided a device comprising: means for
transmitting an enhanced wake-up signal to a wake-up receiver of a network node; and based on the transmitting, setting up a timer (T), wherein the timer (T) indicates a time period within which an enhanced wake-up signal response is to be received from the wake-up receiver.

According to another aspect, there is provided a method comprising:
transmitting, by a device to a wake-up receiver of a network node, an enhanced wake-up signal; and based on the transmitting, setting up a timer (T), wherein the timer (T) indicates a time period within which an enhanced wake-up signal response is to be received by the device from the wake-up receiver.

According to another aspect, there is provided a non-transitory computer readable medium comprising program instructions which, when executed by a device, cause the device to perform at least the following:
transmit an enhanced wake-up signal to a wake-up receiver of a network node; and based on the transmitting, set up a timer (T), wherein the timer (T) indicates a time period within which an enhanced wake-up signal response is to be received from the wake-up receiver.

LIST OF DRAWINGS

Figure 2:
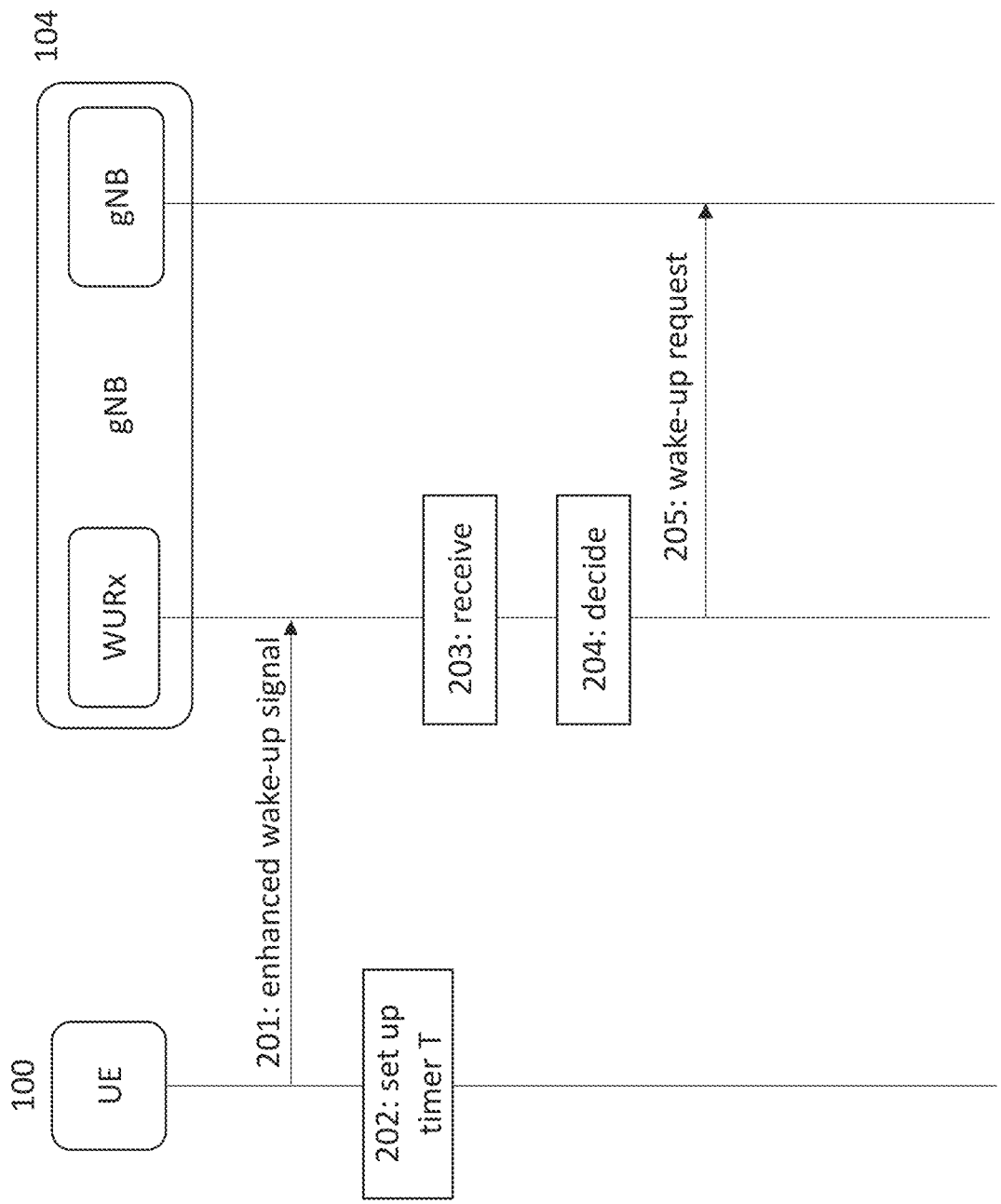
Figure 3:
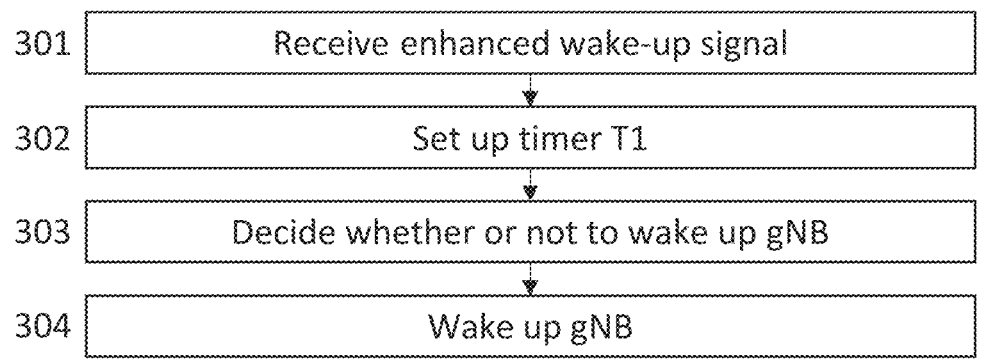
Figure 4:
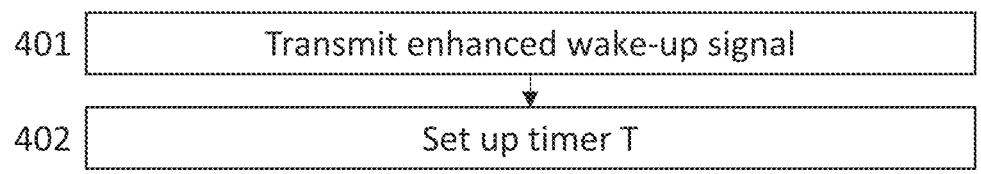
Figure 5:
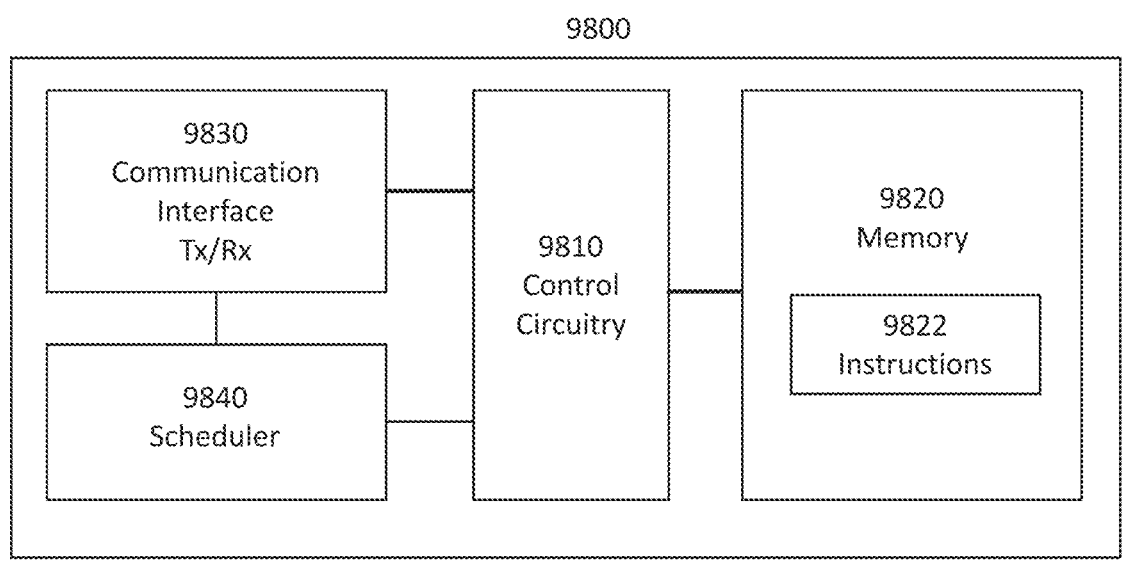
Figure 6:
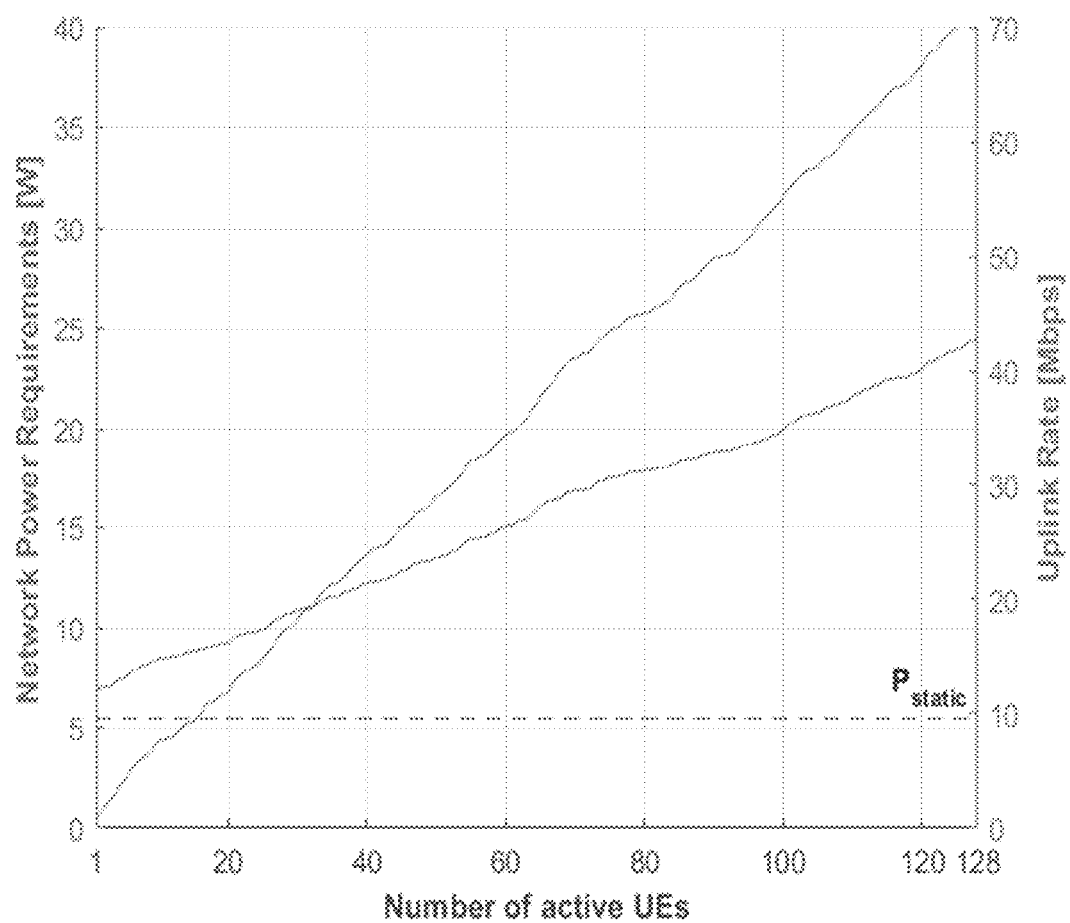
Figure 7:
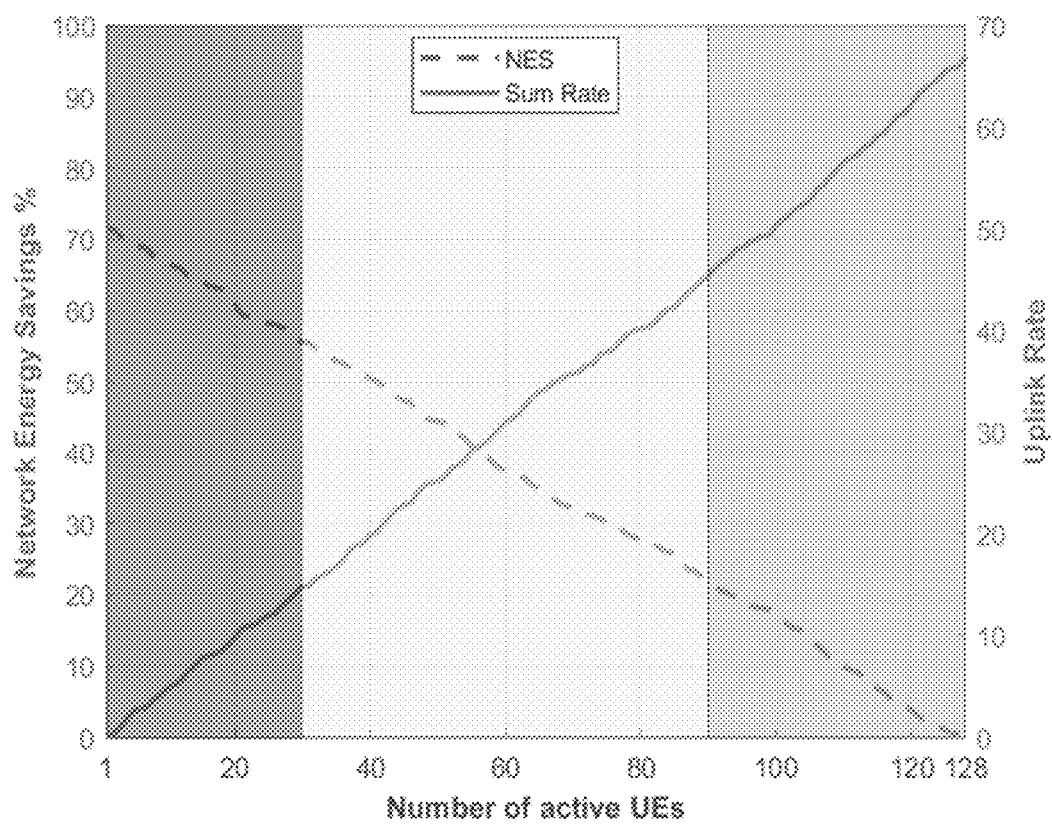
Figure 8:
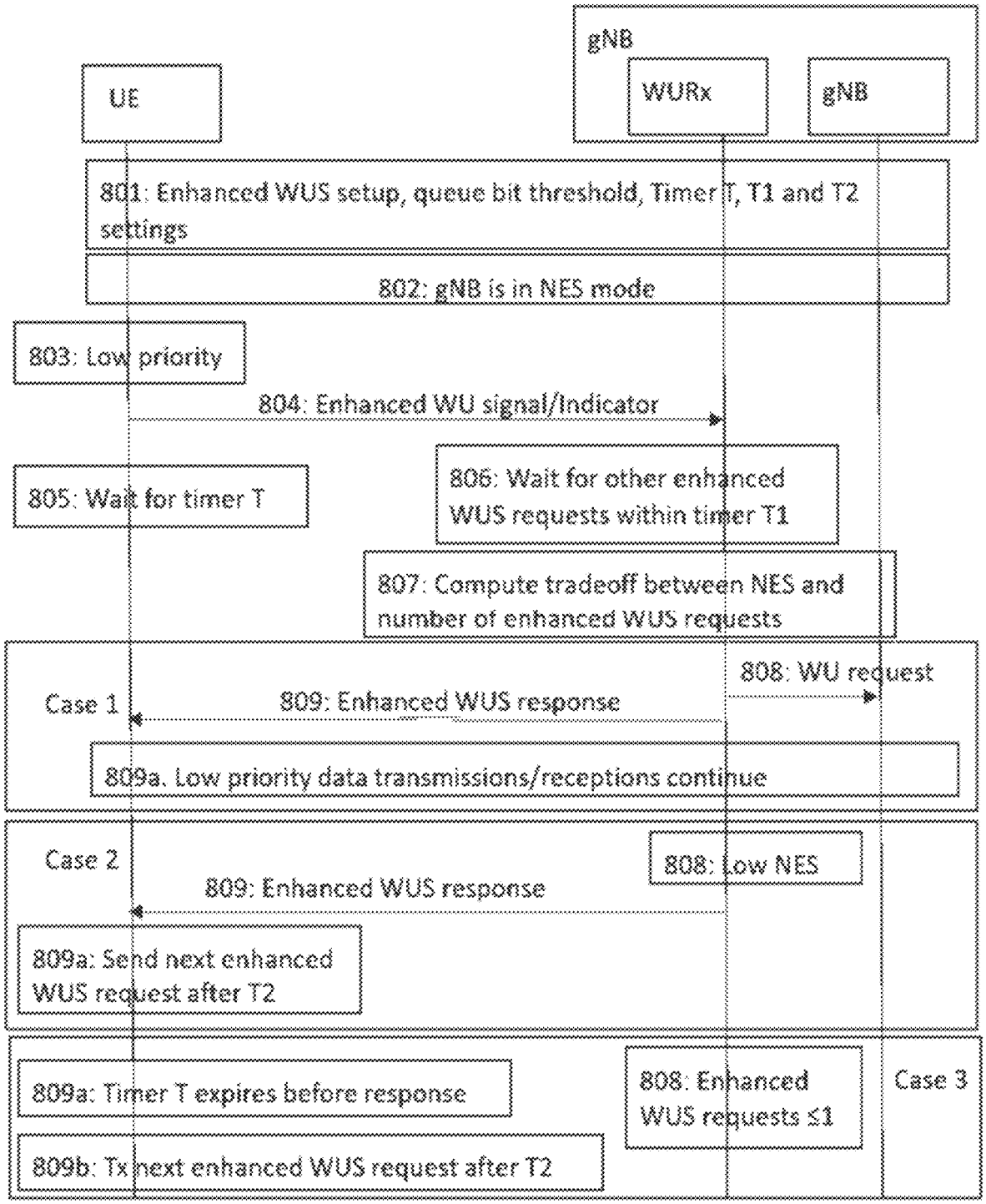
Figure 9:
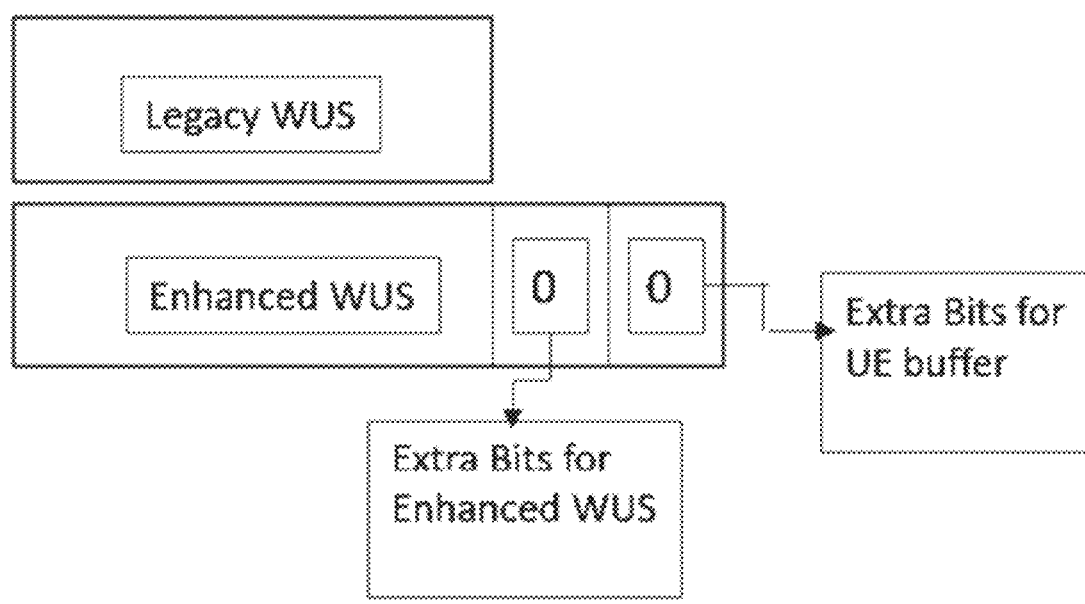
Figure 10:
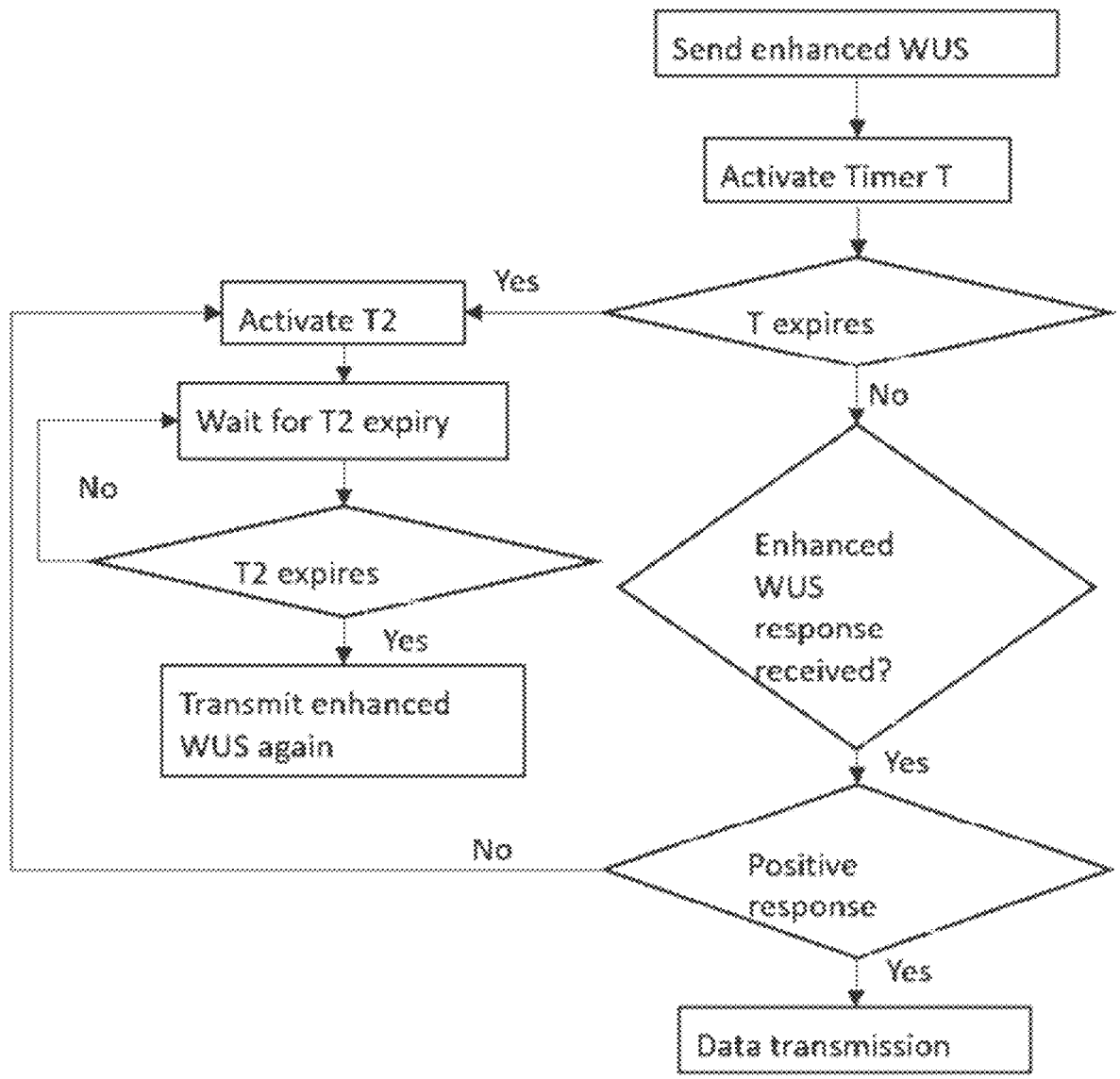
Figure 11:
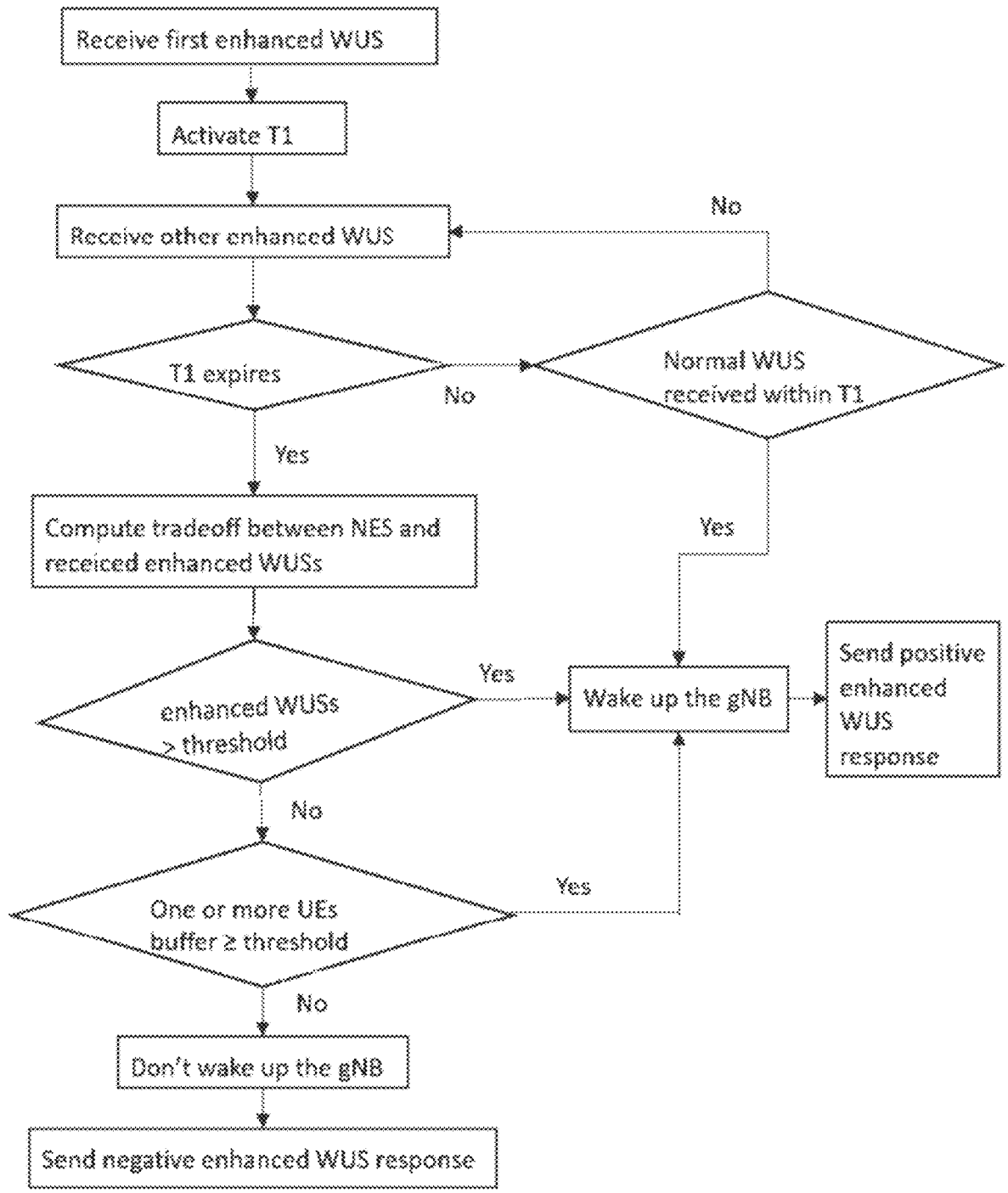

In the following, various example embodiments will be described in greater detail with reference to the accompanying drawings, in which
FIG. 1 illustrates an example of a wireless communication network;
FIG. 2 illustrates an example embodiment for improving network energy saving;
FIGS. 3 and 4 illustrate various embodiments of carrying out the process of FIG. 2;
FIG. 5 illustrates a block diagram of a structure of an apparatus according to an embodiment;
FIG. 6 illustrates network power vs. uplink rate with increasing UEs;
FIG. 7 illustrates NES vs. uplink rate with increasing UEs;
FIGS. 8, 10 and 11 illustrate various embodiments of carrying out the process;
FIG. 9 illustrates enhanced WUS and UE buffer status bits.

DETAILED DESCRIPTION

The following embodiments are exemplifying. Although the specification may refer to "an", "one", or "some"

embodiment(s) in several locations of the text, this does not necessarily mean that each reference is made to the same embodiment(s), or that a particular feature only applies to a single embodiment. Single features of different embodiments may also be combined to provide other embodiments.

Some example embodiments described herein may be implemented in a wireless communication network comprising a radio access network based on one or more of the following radio access technologies (RATs): Global System for Mobile Communications (GSM) or any other second generation radio access technology, Universal Mobile Telecommunication System (UMTS, 3G) based on basic wideband-code division multiple access (W-CDMA), high-speed packet access (HSPA), Long Term Evolution (LTE), LTE-Advanced, fourth generation (4G), fifth generation (5G), 5G new radio (NR), 5G-Advanced (i.e., 3GPP NR Rel-18 and beyond), or sixth generation (6G). Some examples of radio access networks include the universal mobile telecommunications system (UMTS) radio access network (UTRAN), the Evolved Universal Terrestrial Radio Access network (E-UTRA), or the next generation radio access network (NG-RAN). The wireless communication network may further comprise a core network, and some example embodiments may also be applied to network functions of the core network.

It should be noted that the embodiments are not restricted to the wireless communication network given as an example, but a person skilled in the art may also apply the solution to other wireless communication networks or systems provided with necessary properties. For example, some example embodiments may also be applied to a communication system based on IEEE 802.11 specifications, or a communication system based on IEEE 802.15 specifications. IEEE is an abbreviation for the Institute of Electrical and Electronics Engineers.

FIG. 1 depicts an example of a simplified wireless communication network showing some physical and logical entities. The connections shown in FIG. 1 may be physical connections or logical connections. It is apparent to a person skilled in the art that the wireless communication network may also comprise other physical and logical entities than those shown in FIG. 1.

The example embodiments described herein are not, however, restricted to the wireless communication network given as an example but a person skilled in the art may apply the example embodiments described herein to other wireless communication networks provided with necessary properties.

The example wireless communication network shown in FIG. 1 includes a radio access network (RAN) and a core network 110.

FIG. 1 shows user equipment (UE) 100, 102 configured to be in a wireless connection on one or more communication channels in a radio cell with an access node 104 of a radio access network.

The access node 104 may comprise a computing device configured to control the radio resources of the access node 104 and to be in a wireless connection with one or more UEs 100, 102. The access node 104 may also be referred to as a base station (BS), a base transceiver station (BTS), an access point, a cell site, a network node, a radio access network node, or a RAN node. The access node 104 may be, for example, an evolved NodeB (abbreviated as eNB or eNodeB), or a next generation evolved NodeB (abbreviated as ng-eNB), or a next generation NodeB (abbreviated as gNB or gNodeB), providing the radio cell. The access node 104 may include or be coupled to transceivers. From the transceivers of the access node 104, a connection may be provided to an antenna unit that establishes a bi-directional radio link to one or more UEs 100, 102. The antenna unit may comprise an antenna or antenna element, or a plurality of antennas or antenna elements.

The wireless connection (e.g., radio link) from a UE 100, 102 to the access node 104 may be called uplink (UL) or reverse link, and the wireless connection (e.g., radio link) from the access node 104 to the UE 100, 102 may be called downlink (DL) or forward link. A UE 100 may also communicate directly with another UE 102, and vice versa, via a wireless connection generally referred to as a sidelink (SL). It should be appreciated that the access node 104 or its functionalities may be implemented by using any node, host, server, access point or other entity suitable for providing such functionalities.

The radio access network may comprise more than one access node 104, in which case the access nodes may also be configured to communicate with one another over wired or wireless links. These links between access nodes may be used for sending and receiving control plane signaling and also for routing data from one access node to another access node.

The access node 104 may further be connected to a core network (CN) 110. The core network 110 may comprise an evolved packet core (EPC) network and/or a 5th generation core network (5GC). The EPC may comprise network entities, such as a serving gateway (S-GW for routing and forwarding data packets), a packet data network gateway (P-GW) for providing connectivity of UEs to external packet data networks, and/or a mobility management entity (MME). The 5GC may comprise one or more network functions, such as at least one of: an access and mobility management function (AMF) 111, a user plane function (UPF), a location management function (LMF), and/or a session management function (SMF).

The core network 110 may also be able to communicate with one or more external networks 113, such as a public switched telephone network or the Internet, or utilize services provided by them. For example, in 5G wireless communication networks, the UPF of the core network 110 may be configured to communicate with an external data network via an N6 interface. In LTE wireless communication networks, the P-GW of the core network 110 may be configured to communicate with an external data network.

It should also be understood that the distribution of functions between core network operations and access node operations may differ in future wireless communication networks compared to that of the LTE or 5G, or even be non-existent.

The illustrated UE 100, 102 is one type of an apparatus to which resources on the air interface may be allocated and assigned. The UE 100, 102 may also be called a wireless communication device, a subscriber unit, a mobile station, a remote terminal, an access terminal, a user terminal, a terminal device, or a user device, just to mention but a few names. The UE 100, 102 may be a computing device operating with or without a subscriber identification module (SIM), including, but not limited to, the following types of computing devices: a mobile phone, a smartphone, a personal digital assistant (PDA), a handset, a computing device comprising a wireless modem (e.g., an alarm or measurement device, etc.), a laptop computer, a desktop computer, a tablet, a game console, a notebook, a multimedia device, a reduced capability (RedCap) device, a wearable device (e.g., a watch, earphones or eyeglasses) with radio parts, a sensor comprising a wireless modem, or a computing device comprising a wireless modem integrated in a vehicle.

It should be appreciated that the UE 100, 102 may also be a nearly exclusive uplink-only device, of which an example may be a camera or video camera loading images or video clips to a network. The UE 100, 102 may also be a device having capability to operate in an Internet of Things (IoT) network, which is a scenario in which objects may be provided with the ability to transfer data over a network without requiring human-to-human or human-to-computer interaction.

The wireless communication network may also be able to support the usage of cloud services. For example, at least part of core network operations may be carried out as a cloud service (this is depicted in FIG. 1 by "cloud" 114). The UE 100, 102 may also utilize the cloud 114. In some applications, the computation for a given UE may be carried out in the cloud 114 or in another UE.

The wireless communication network may also comprise a central control entity, such as a network management system (NMS), or the like. The NMS is a centralized suite of software and hardware used to monitor, control, and administer the network infrastructure. The NMS is responsible for a wide range of tasks such as fault management, configuration management, security management, performance management, and accounting management. The NMS enables network operators to efficiently manage and optimize network resources, ensuring that the network delivers high performance, reliability, and security.

5G enables using multiple-input and multiple-output (MIMO) antennas in the access node 104 and/or the UE 100, 102, many more base stations or access nodes than an LTE network (a so-called small cell concept), including macro sites operating in co-operation with smaller stations and employing a variety of radio technologies depending on service needs, use cases and/or spectrum available. 5G wireless communication networks may support a wide range of use cases and related applications including video streaming, augmented reality, different ways of data sharing and various forms of machine-type applications, such as (massive) machine-type communications (mMTC), including vehicular safety, different sensors and real-time control.

In 5G wireless communication networks, access nodes and/or UEs may have multiple radio interfaces, such as below 6 gigahertz (GHz), centimeter wave (cmWave) and millimeter wave (mmWave), and also being integrable with legacy radio access technologies, such as LTE. Integration with LTE may be implemented, for example, as a system, where macro coverage may be provided by LTE, and 5G radio interface access may come from small cells by aggregation to LTE. In other words, a 5G wireless communication network may support both inter-RAT operability (such as interoperability between LTE and 5G) and inter-RI operability (inter-radio interface operability, such as between below 6 GHz, cmWave, and mmWave).

5G wireless communication networks may also apply network slicing, in which multiple independent and dedicated virtual sub-networks (network instances) may be created within the same physical infrastructure to run services that have different requirements on latency, reliability, throughput and mobility.

In one embodiment, an access node 104 may comprise: a radio unit (RU) comprising a radio transceiver (TRX), i.e., a transmitter (Tx) and a receiver (Rx); one or more distributed units (DUs) 105 that may be used for the so-called Layer 1 (L1) processing and real-time Layer 2 (L2) processing; and a central unit (CU) 108 (also known as a centralized unit) that may be used for non-real-time L2 and Layer 3 (L3) processing. The CU 108 may be connected to the one or more DUs 105 for example via an F1 interface. Such an embodiment of the access node 104 may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU 108 may be a logical node hosting radio resource control (RRC), service data adaptation protocol (SDAP) and/or packet data convergence protocol (PDCP), of the NR protocol stack for an access node 104. The CU 108 may comprise a control plane (CU-CP), which may be a logical node hosting the RRC and the control plane part of the PDCP protocol of the NR protocol stack for the access node 104. The CU 108 may further comprise a user plane (CU-UP), which may be a logical node hosting the user plane part of the PDCP protocol and the SDAP protocol of the CU for the access node 104.

The DU 105 may be a logical node hosting radio link control (RLC), medium access control (MAC) and/or physical (PHY) layers of the NR protocol stack for the access node 104. The operations of the DU 105 may be at least partly controlled by the CU 108. It should also be understood that the distribution of functions between the DU 105 and the CU 108 may vary depending on the implementation.

Cloud computing systems may also be used to provide the CU 108 and/or DU 105. A CU provided by a cloud computing system may be referred to as a virtualized CU (vCU). In addition to the vCU, there may also be a virtualized DU (vDU) provided by a cloud computing system. Furthermore, there may also be a combination, where the DU may be implemented on so-called bare metal solutions, for example application-specific integrated circuit (ASIC) or customer-specific standard product (CSSP) system-on-a-chip (SoC).

Edge cloud may be brought into the radio access network by utilizing network function virtualization (NFV) and software defined networking (SDN). Using edge cloud may mean access node operations to be carried out, at least partly, in a computing system operationally coupled to a remote radio head (RRH) or a radio unit (RU) of an access node 104. It is also possible that access node operations may be performed on a distributed computing system or a cloud computing system located at the access node 104. Application of cloud RAN architecture enables RAN real-time functions being carried out at the radio access network (e.g., in a DU 105), and non-real-time functions being carried out in a centralized manner (e.g., in a CU 108).

5G (or new radio, NR) wireless communication networks may support multiple hierarchies, where multi-access edge computing (MEC) servers may be placed between the core network 110 and the access node 104. It should be appreciated that MEC may be applied in LTE wireless communication networks as well.

A 5G wireless communication network ("5G network") may also comprise a non-terrestrial communication network, such as a satellite communication network, to enhance or complement the coverage of the 5G radio access network. For example, satellite communication may support the transfer of data between the 5G radio access network and the core network 110, enabling more extensive network coverage. Possible use cases may include: providing service continuity for machine-to-machine (M2M) or Internet of Things (IoT) devices or for passengers on board of vehicles, or ensuring service availability for critical communications, and future railway, maritime, or aeronautical communications. Satellite communication may utilize geostationary earth orbit (GEO) satellite systems, but also low earth orbit (LEO) satellite systems, in particular mega-constellations (i.e., systems in which hundreds of (nano) satellites are deployed). A given satellite 106 in the mega-constellation may cover several satellite-enabled network entities that create on-ground cells. The on-ground cells may be created through an on-ground relay access node or by an access node located on-ground or in a satellite.

It is obvious for a person skilled in the art that the access node 104 depicted in FIG. 1 is just an example of a part of a radio access network, and in practice the radio access network may comprise a plurality of access nodes 104, the UEs 100, 102 may have access to a plurality of radio cells, and the radio access network may also comprise other apparatuses, such as physical layer relay access nodes or other entities. At least one of the access nodes may be a Home eNodeB or a Home gNodeB. A Home gNodeB or a Home eNodeB is a type of access node that may be used to provide indoor coverage inside a home, office, or other indoor environment.

Additionally, in a geographical area of a radio access network, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The access node(s) 104 of FIG. 1 may provide any kind of these cells. A cellular radio network may be implemented as a multilayer access networks including several kinds of radio cells. In multilayer access networks, one access node may provide one kind of a radio cell or radio cells, and thus a plurality of access nodes may be needed to provide such a multilayer access network.

For fulfilling the need for improving performance of radio access networks, the concept of "plug-and-play" access nodes may be introduced. A radio access network, which may be able to use "plug-and-play" access nodes, may include, in addition to Home eNodeBs or Home gNodeBs, a Home Node B gateway (HNB-GW) (not shown in FIG. 1). An HNB-GW, which may be installed within an operator's radio access network, may aggregate traffic from a large number of Home eNodeBs or Home gNodeBs back to a core network 110 of the operator.

Some example embodiments are described below using principles and terminology of 5G radio access technology without limiting the example embodiments to 5G radio access technology, however.

FIG. 2 illustrates a signal flow diagram according to an example embodiment.

Referring to FIG. 2, at 201, a device 100, such as a terminal device, may transmit an enhanced wake-up signal to a wake-up receiver WURx of an apparatus 104. Based on the transmitting, the device 100 may set up a timer T, wherein the timer T indicates a time period within which an enhanced wake-up signal response is to be received from the wake-up receiver. The device may set up the timer T based on a configuration determined by the network node for the device. The enhanced wake-up signal 201 may include a device buffer status flag to indicate to the network node a device buffer status. The device 100 may indicate a high or full device buffer status by turning on the device buffer status flag, and/or indicate a low device buffer status by turning off the device buffer status flag.

The apparatus 104 may, at 202, receive, by the wake-up receiver WURx of the apparatus 104, from at least one terminal device 100, at least one enhanced wake-up signal 201, and set up a timer T1. The timer T1 in the WURx may be shorter than the timer T in the UE. The apparatus 104 may be a network node, such as an access node gNB. At 204, the wake-up receiver WURx may decide, based on the at least one enhanced wake-up signal, whether or not to wake-up the apparatus 104 from a network energy saving mode.

In one embodiment, the decision 204 whether or not to wake-up the apparatus 104 from the network energy saving mode may be based on a number of enhanced wake-up signals received before expiry of the timer T1. In one embodiment, the decision whether or not to wake-up the apparatus 104 from the network energy saving mode may be based on whether or not at least one normal (i.e. legacy or "unenhanced" or "non-provisional") wake-up signal is received from the at least one terminal device 100, 102 before expiry of the timer T1. In one embodiment, the decision whether or not to wake-up the apparatus 104 from the network energy saving mode may based on whether or not a user terminal buffer status flag is turned on in the enhanced wake-up signal.

In one embodiment, the wake-up receiver WURx may decide 204 not to wake-up the apparatus 104 from the network energy saving mode, if a number of enhanced wake-up signals received before expiry of the timer T1 is low, if no normal (i.e. legacy or "unenhanced" or "non-provisional") wake-up signal is received from at least one terminal device UE before the expiry of the timer T1, if no further enhanced wake-up signals are received before expiry of the timer T1, and/or if a user terminal buffer status flag is not turned on in the enhanced wake-up signal. The legacy wake-up signal may be prioritized, so if it is received, the apparatus may be forced to wake-up.

In one embodiment, the wake-up receiver WURx may decide 204 to wake-up 205 the apparatus 104 from the network energy saving mode, if a number of enhanced wake-up signals received before expiry of the timer T1 is high, if an unenhanced wake-up signal is received from at least one terminal device before the expiry of the timer T1, if further enhanced wake-up signals are received before the expiry of the timer T1, and/or if a user terminal buffer status flag is turned on in the enhanced wake-up signal. If the wake-up receiver WURx decides 204 to wake-up the apparatus 104 from the network energy saving mode, the wake-up receiver WURx may, at 205, send a wake-up request to the apparatus gNB, 104.

FIG. 3 illustrates a flow chart according to an example embodiment of a method performed by an apparatus 9800 depicted in FIG. 5. For example, the apparatus 9800 may be, or comprise, or be comprised in, a radio access network node 104, 104B, 104C or a distributed unit 105, 105B or a central unit 108, 108B.

Referring to FIG. 3, in block 301, the apparatus 104 may receive, by a wake-up receiver WURx of the apparatus 104, from at least one terminal device UE, 100, 102, at least one enhanced wake-up signal, and, in response to that, set up a timer T1, at block 302. In block 303, the wake-up receiver WURx may decide, based on the at least one enhanced wake-up signal, whether or not to wake-up the apparatus gNB, 104 from a network energy saving mode.

In one embodiment, the decision whether or not to wake-up the apparatus 104 from the network energy saving mode may be based on a number of enhanced wake-up signals received before expiry of the timer T1. In one embodiment, the decision whether or not to wake-up the apparatus 104 from the network energy saving mode may be based on whether or not at least one unenhanced wake-up signal is received from the at least one terminal device 100, 102 before expiry of the timer T1. In one embodiment, the decision whether or not to wake-up the apparatus 104 from the network energy saving mode may based on whether or not a user terminal buffer status flag is turned on in the enhanced wake-up signal.

In one embodiment, the wake-up receiver WURx may decide 303 not to wake-up the apparatus 104 from the network energy saving mode, if a number of enhanced wake-up signals received before expiry of the timer T1 is low, if no unenhanced wake-up signal is received from at least one terminal device UE before the expiry of the timer T1, if no further enhanced wake-up signals are received before expiry of the timer T1, and/or if a user terminal buffer status flag is not turned on in the enhanced wake-up signal.

In one embodiment, the wake-up receiver WURx may decide 303 to wake-up 205 the apparatus 104 from the network energy saving mode, if a number of enhanced wake-up signals received before expiry of the timer T1 is high, if an unenhanced wake-up signal is received from at least one terminal device before the expiry of the timer T1, if further enhanced wake-up signals are received before the expiry of the timer T1, and/or if a user terminal buffer status flag is turned on in the enhanced wake-up signal. If the wake-up receiver WURx decides 303 to wake-up the apparatus 104 from the network energy saving mode, the wake-up receiver WURx may, in block 304, send a wake-up request to the apparatus gNB, 104.

FIG. 4 illustrates a flow chart according to an example embodiment of a method performed by a device 9800 depicted in FIG. 5. For example, the device 9800 may be, or comprise, or be comprised in, a terminal device 100, 102, such as a user equipment UE.

Referring to FIG. 4, in block 401, the device 100, 102 may transmit an enhanced wake-up signal to a wake-up receiver WURx of an apparatus 104. Based on the transmitting, the device 100, 102 may set up a timer T, wherein the timer T indicates a time period within which an enhanced wake-up signal response is to be received from the wake-up receiver. The device may set up the timer T based on a configuration determined by the network node 104 for the device 100, 102. The enhanced wake-up signal may include a device buffer status flag to indicate to the network node 104 a device buffer status. The device 100 may indicate a high or full device buffer status by turning on the device buffer status flag in the enhanced wake-up signal, and/or indicate a low device buffer status by turning off the device buffer status flag in the enhanced wake-up signal. The enhanced WUS and device buffer status flag or bit(s) is further illustrated in FIG. 9.

The blocks, related functions, and information exchanges (messages) described above by means of FIGS. 2-4 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

When the apparatus is able to wake up only when it is triggered, power consumption may be dramatically reduced. This may be achieved by using a wake-up signal to trigger the main radio and a separate receiver that is able to monitor wake-up signals with ultra-low power consumption. The power consumption for monitoring wake-up signals may depend on the wake-up signal design and the hardware module of the wake-up receiver used for signal detecting and processing.

In each wake-up cycle, called a w-cycle, the wake-up receiver WURx may monitor a set of specified subcarriers for a short duration of time to determine whether it receives a wake-up indicator (WI) or not. Through the WI, the network may inform the apparatus to decode the PDCCH with a specified time offset, called w-offset. Once the WURx successfully detects the WI, a baseband processor (BBP) may be switched on. After that, the BBP may decode the PDCCH messages at an active state for a preconfigured on-duration period, followed by an initiation of its inactivity timer. After the inactivity timer is initiated, and if a new PDCCH message is received before the timer expiration, the BBP may re-initiate its inactivity timer. However, if there is no PDCCH message received before the expiration of the inactivity timer, a sleep period may start, the apparatus may switch to its sleep state, and the WURx may operate according to its w-cycle.

The WUS reduces the apparatus energy consumption compared to baseline DRX as the energy consumption related to decoding unscheduled PDCCHs is avoided. Moreover, since the w-cycle may be short without essentially increasing the energy consumption, the buffering delay may be reduced compared to DRX.

An embodiment enables to improve the NES without compromising the latency requirement of the devices. An embodiment enables to avoid a situation where a low-priority UE waking up the access node or base station leads to high power consumption at the access node side.

An enhanced wake-up signal or provisional wake-up signal is proposed herein for low-priority or low-rate access. Based on the data priority, the UE may send the legacy or "normal WUS" to wake up the access node. Alternatively, the UE may send the enhanced or "provisional" WUS in case of low-priority data/access and leave it up to the network (e.g. wake-up receiver (WURx)) to decide whether to wake up (WU) the access node or not. This decision may be performed by comparing the trade-off between NES with the number of low-priority access received within a particular timer T1, and the buffer status report of the UEs. In case the number of low-priority access received within timer T1 could not be compromised with the NES (e.g. a high number of low-priority access or an indication of the full buffer of one or more UEs), the gNB WURx may wake up the gNB and send a "positive enhanced WUS response" to the UE to indicate the gNB active state. Alternatively, if the NES is more important (e.g. provisional requests are low with no/low full buffer indication), the WURx may send a "negative enhanced WUS response" to indicate the UE to wait for another timer T2 before sending the next request.

The energy consumed by the wake-up receiver may be, in general, modelled as the energy consumed by the components that maintain the necessary operation plus the energy consumed by the decoding stages corresponds to Rx activities. The access node power consumption in active uplink (UL) state $P^{UL}$ may be expressed as $$P^{UL} = s_a \cdot P^{UL}_{dyn,ante} + P^{UL}_{static}$$

Where $s_a$ is the fraction of active transceiver units, and $$P_{dyn,ante}^{UL} = P_{ActiveUL} + P_{dec}(R) - P_{microsleep}$$

There is no standardized and extensively recognized model for decoding power consumption $P_{dec}(R)$. Nonetheless, the decoding power consumption increases with the data rate, which is in turn correlated with the coding rate R. Herein an abstract, generic linear function model is assumed describing a relationship between the data rate and the power consumed by the decoder given by $$P_{dec}(R) = \sum_{k=1}^{K} v_k R_k$$

where $v_k$ may be decoder and user-specific, and it may model decoder efficiency. Expected uplink sum rate R may be defined as $$R = \sum_{k=1}^{K} R_k$$

and NES gain NES % as:

$$NES \% = \frac{P^{max} - P^{UL}}{P^{max}} \cdot 100$$

where $P^{max}$ is active UL state power consumption with maximum load and active UEs. Table 1 illustrates simulation parameter assumptions.

TABLE 1

| Parameter | Assumption | Descriptions |
|---|---|---|
| $s_a$ | 1 | fraction of active transceiver units |
| $P_{ActiveUL}$ | 6.5 | for BS category 2 Set 1 |
| $v_k$ | rand[0.1, 0.4], $\forall$ k | decoder efficiency |
| $R_k$ | rand[0.1, 1], $\forall$ k | uplink rate of UE |
| $P_{microsleep}$ | 5.5 | for BS category 2 Set 1 |

As shown in FIG. 6, the expected uplink sum rate R may increase with increasing active UE, e.g. (enhanced/provisional) WUS requests from UE for the uplink data transmission. On the contrary, increasing active UEs may lead to a rise in network power consumption $P^{UL}$. This may increase power consumption, in turn, resulting in the reduced NES. Additionally, transitioning to an active state may incur a fixed energy cost, quantified as follows: 1) Deep Sleep: 1000; 2) Light Sleep: 90; 3) Microsleep: 0. The WURx and its associated signalling may be designed to preemptively balance these trade-offs when deciding to activate the access node.

The WURx may initiate the WU process for the gNB in the case of reception of a normal WUS within timer T1, or when some UE's buffer is nearly full, thereby preventing the data overflows. In addition, there may be other example cases as described below.

In case 1 of FIG. 7, the WURx may receive a high number of enhanced (provisional) WUS requests, and it may anticipate a higher expected uplink data rate. Thus, in response, the WURx may decide to WU the gNB to ensure the performance of critical applications and prevent, if any, capacity loss.

In case 2 of FIG. 7, the WURx may receive a relatively few enhanced (provisional) WUS requests, indicating a lower expected uplink data rate. Moreover, the UEs may be with sufficient buffer space. In this case, the WU of the gNB may significantly degrade the NES. This is due to the additional fixed transition energy that may also be required for ramping up to the active state (and back to the sleep state). Thus, in this region, WURx may decide not to wake up the access node, i.e. to prioritize the NES instead. Additionally, the UE may be asked to send the next enhanced WUS after another timer T2 in the enhanced WUS response message.

In a trade-offs region of FIG. 7, to improve the NES while avoiding outage and UE QoS degradation, the WURx may preemptively characterize the achievable rate-energy trade-offs by looking at each provisional/enhanced WUS additional bits, especially a "queue bit" used for UE buffer status. As an example, WURx may decide not to wake up the gNB, if the UE's buffer has enough space and the requested UEs are able to support large delays. Conversely, a surge in the enhanced/provisional WUS requests may emphasize the minimization of UE's queue backlogs by waking up the gNB, and vice versa.

The above results may scale differently for different system configurations, and network requirements. However, the underlying relationship between the parameters, e.g. $P^{UL}$, R and NES may still hold. In summary, with the enhanced WUS setup, the associated timer, and the UE's queue bit together with the associated signalling and implementation steps, QoS requirements may be guaranteed with significantly lower network and transition power consumption. In addition, compared to the baseline WUS scheme, higher network energy saving may be provided.

Thus the NES may be improved, dynamic adjustments to the gNB wake-up decision and proactive barring (if the NES is low, stop low-priority access) may be provided by using a very simplified procedure.

The terminal device may be a Redcap UE. These may include industrial wireless sensors where communication service availability may be 99.99% and end-to-end latency may be less than 100 ms. The reference bit rate may be less than 2 Mbps (potentially asymmetric e.g. UL heavy traffic) for each use case, and the device may be expected to be mostly stationary. The battery may last at least a few years. For safety-related sensors, the latency requirement may be stringer that is around 5-10 ms. For video surveillance devices, the reference economic video bit rate may be 2-4 Mbps, with a latency requirement <500 ms, and a reliability requirement of 99-99.9%. High-end video applications, e.g. for farming may require 7.5-25 Mbps. The traffic pattern may be dominated by UL transmissions. For wearable devices, the reference bit rate for smart wearable applications may be 10-50 Mbps in DL, and a minimum of 5 Mbps in UL, and the peak bit rate of the device may be higher, that is around 150 Mbps for downlink and 50 Mbps for uplink. The battery of the device may last multiple days (up to 1-2 weeks).

The terminal device may be an ambient IoT device possibly with improved coverage (i.e. 30 m indoors and up to 100 m outdoors) and increased device density with ultra-low-cost and power consumption. Passive IoT devices may be devices that are battery-less or devices that have batteries but do not need battery replacement over the lifetime of the device. These devices may be expected to have lower complexity, data rate, coverage, cost, and energy consumption than NB-IoT/eMTC. The use cases for passive IoT devices may include identification, tracking, monitoring, sensing, logistics and supply chain management, transportation, manufacturing (factory automation), healthcare, energy, agriculture, transportation, smart cities, environment, extreme conditions, and hazardous environments in some use cases (environments where devices with batteries is not an option). The passive IoT devices may enable improved link budget compared to existing RFID solutions, frequency bands for global usability, ultra low-cost, no need for battery charging or replacement (enabling low maintenance long life cycle operation), ultra-low-power (e.g. <100 micro-Watts, to enable operation with back-scattering or energy harvesting), small device size, form-factor, positioning accuracy (e.g. 3-5 m), data rate e.g. 10-100 kbps. The energy source for passive devices may be the use of back-scattering techniques, and semi-passive devices may be devices operating with energy harvesting or with a very small battery (e.g. <100 mAh).

FIG. 8 illustrates a signal flow diagram according to an example embodiment. FIG. 10 illustrates a flow chart according to an example embodiment of a method performed by an apparatus 104. FIG. 11 illustrates a flow chart according to an example embodiment of a method performed by a terminal device 100, 102.

Referring to FIGS. 8, 10 and 11, in enhanced WUS setup, the access node 104 may configure 801 the enhanced (or provisional) WUS and related additional parameters and indicate 801 them to the UEs 100, 102. The configuration may be carried out using broadcast (system information) and/or dedicated (e.g. RRC reconfiguration) signalling. The access node may support two types of WUS which the UE may use to wake up (WU) the gNB. One may be the legacy "normal WUS" and the other may be the enhanced WUS or provisional WUS. The additional parameters may be the timers T, T1 and/or T2. A further additional parameter may be a "queue bit threshold" which may be an additional bit in the WUS to indicate a UE buffer status report, as illustrated in FIG. 9. FIG. 9 illustrates enhanced WUS and UE buffer status bits, in comparison to legacy WUS. The gNB may continue 802 its NES mode in case there are no active transmissions or receptions. An assumption may be that the WURx is hosted by the gNB which may have limited processing capabilities. The UE or a group of UEs may have 803 low-priority data to be sent to the gNB. The UEs may be RedCap or Ambient IoT sensors that respond to the network in case there are alarms. The UE may send 804 an enhanced WUS to the WURx of the access node. The enhanced WUS may be implemented by declaring an additional bit in the "normal" WUS where e.g. the additional bit "0" means the WUS is an "enhanced WUS" and "1" means it is a normal (legacy) WUS. The UE may wait 805 for an expiry of timer T until the gNB WURx responds 809 to its enhanced wake-up signal. The timer T may be a waiting timer for the UE which may include the WURx processing of UE's and other UE's request and computation of a decision of whether to wake up the gNB or not. After receiving the first enhanced WUS, the WURx at the gNB waits 806 for expiry of a timer T1 to receive an enhanced WUS or normal WUS from the other UEs. The timer T1 may be smaller than the timer T. The timer T1 may include the time for reception of other requests and processing of the requests. The gNB may compute 807 a tradeoff between NES and the number of enhanced WUSs received within the timer T1 (e.g. expected uplink data rate). In case the enhanced WUS includes an "extra bit for the UE buffer status" to indicate the UE buffer status report, this may also be included in the computation of the tradeoff. For example, if the UE's buffer is full or above the "queue bit threshold" indicated, the UE may turn ON this bit to indicate to the access node a possible data loss. With this information, the network may improve its decision of waking up the gNB. Turning ON the UE buffer status bit may be based on a threshold (i.e. queue bit threshold), e.g. if the buffer is 80% full, the UE may turn ON this bit. Then the WURx may be ready with its decision. The WURx may decide to wake up the gNB due to a high number of received enhanced WUSs or due to reception of a normal WUS within timer T1 or due to some UE's buffer being full. In this case, the WURx may send 808 an indication to the gNB to wake up (case 1 in FIG. 8). Alternatively, the WURx may decide 808 to not wake up the gNB as the NES is too low, because the number of enhanced WUSs is low or the UE's buffer has enough space, and the requested UEs may support large delays (case 2 in FIG. 8). Yet in another alternative, the WURx may decide 808 to not wake up the gNB, as the number of enhanced WUSs received is only 1 (case 3 in FIG. 8). The WURx may send an enhanced WUS response 809 to the UE (cases 1, 2 in FIG. 8). The UE may continue 809a sending low-priority data, or the UE may be asked to send 809a the next enhanced WUS after expiry of another timer T2 which may be based on the delay requirement of the UE. Alternatively, the timer T2 may be based on the gNB sleep state which may be indicated dynamically with the WUS response. The WURx may also decide not to send any response (case 3 in FIG. 8). So after the expiry of the timer T 809a at the UE side, the UE may assume rejection of its request. The UE may be assumed to send 809b the next enhanced WUS after expiry of another timer T2. Alternatively, the UE may choose a different timer T2 based on the delay requirement of the UE.

In one embodiment, the gNB may comprise the wake-up receiver, wherein the gNB itself may follow the sleep mode, while its WURx does WUS transmissions/receptions and based on that decide to activate the gNB from a NES mode. In one embodiment, the gNB does not comprise a separate WURx, wherein the gNB may activate a few of its resources while following the NES mode for WUS reception and transmission of WUS response (e.g. 5% of active resources, e.g. in case 2, or tradeoff region, of FIG. 7 to maximize NES), and decide to activate more resources based on the determination. Thus, the term WURx herein may refer to a separate WURx, and/or to the gNB itself acting as WURx i.e. receiving the WUS and transmitting the WUS response.

In one embodiment, a non-transitory computer readable medium is disclosed, comprising program instructions which, when executed by an apparatus 104, cause the apparatus 104 to receive, from at least one terminal device UE, 100, 102 by a wake-up receiver WURx of the apparatus gNB, 104, at least one enhanced wake-up signal; and decide, by the wake-up receiver WURx, based on the at least one enhanced wake-up signal, whether or not to wake-up the apparatus 104 from a network energy saving mode.

In one embodiment, a non-transitory computer readable medium is disclosed, comprising program instructions which, when executed by a device UE, 100, 102, cause the device UE, 100, 102 to transmit an enhanced provisional wake-up signal to a wake-up receiver WURx of a network node gNB, 104; and based on the transmitting, set up a timer T, wherein the timer T indicates a time period within which an enhanced provisional wake-up signal response is to be received from the wake-up receiver WURx.

FIG. 5 illustrates an example of an apparatus 9800 comprising means for performing one or more of the example embodiments described above. For example, the apparatus 9800 may be, or comprise, or be comprised in, a radio access network node 104, 104B, 104C or a distributed unit 105, 105B or a central unit 108, 108B. For example, the apparatus 9800 may be, or comprise, or be comprised in, a terminal device 100, 102 such as a user equipment UE.

The apparatus 9800 may comprise, for example, a circuitry or a chipset applicable for realizing one or more of the example embodiments described above. The apparatus 9800 may be an electronic device comprising one or more electronic circuitries. The apparatus 9800 may comprise a communication control circuitry 9810 such as at least one processor, and at least one memory 9820 storing instructions 9822 which, when executed by the at least one processor, cause the apparatus 9800 to carry out one or more of the example embodiments described above. Such instructions 9822 may, for example, include computer program code (software). The at least one processor and the at least one memory storing the instructions may provide the means for providing or causing the performance of any of the methods and/or blocks described above.

The processor is coupled to the memory 9820. The processor is configured to read and write data to and from the memory 9820. The memory 9820 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 9820 stores computer readable instructions that are executed by the processor. For example, non-volatile memory stores the computer readable instructions, and the processor executes the instructions using volatile memory for temporary storage of data and/or instructions.

The computer readable instructions may have been pre-stored to the memory 9820 or, alternatively or additionally, they may be received, by the apparatus, via an electromagnetic carrier signal and/or may be copied from a physical entity such as a computer program product. Execution of the computer readable instructions causes the apparatus 9800 to perform one or more of the functionalities described above.

The memory 9820 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data, such as a current neighbour cell list, and, in some example embodiments, structures of frames used in the detected neighbour cells.

The apparatus 9800 may further comprise or be connected to a communication interface 9830, such as a radio unit, comprising hardware and/or software for realizing communication connectivity with one or more wireless communication devices according to one or more communication protocols. The communication interface 9830 comprises at least one transmitter (Tx) and at least one receiver (Rx) that may be integrated to the apparatus 9800 or that the apparatus 9800 may be connected to. The communication interface 9830 may provide means for performing some of the blocks for one or more example embodiments described above. The communication interface 9830 may comprise one or more components, such as: power amplifier, digital front end (DFE), analog-to-digital converter (ADC), digital-to-analog converter (DAC), frequency converter, (de)modulator, and/or encoder/decoder circuitries, controlled by the corresponding controlling units.

The communication interface 9830 provides the apparatus with radio communication capabilities to communicate in the wireless communication network. The communication interface may, for example, provide a radio interface to one or more UEs 100, 102. The apparatus 9800 may further comprise or be connected to another interface towards a core network 110, such as the network coordinator apparatus or AMF 111, and/or to the access nodes 104 of the wireless communication network.

The apparatus 9800 may further comprise a scheduler 9840 that is configured to allocate radio resources. The scheduler 9840 may be configured along with the communication control circuitry 9810 or it may be separately configured.

It is to be noted that the apparatus 9800 may further comprise various components not illustrated in FIG. 5. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways within the scope of the claims. The embodiments are not limited to the example embodiments described above, but may vary within the scope of the claims. Therefore, all words and expressions should be interpreted broadly, and they are intended to illustrate, not to restrict, the embodiments.

The invention claimed is:

1. An apparatus comprising:
at least one processor, and at least one memory storing instructions that, when executed by the at least one processor, cause the apparatus at least to:
receive, from at least one terminal device by a wake-up receiver of the apparatus, at least one enhanced wake-up signal, wherein, based on transmitting the enhanced wake-up signal, the at least one terminal sets up a timer (T) indicating a time period within which a response to the enhanced wake-up signal is to be received from the wake-up receiver;
decide, by the wake-up receiver, to wake-up the apparatus from a network energy saving mode in response to:
a number of enhanced wake-up signals received before expiry of a wait timer (T1) being above a threshold number, wherein the wait timer (T1) is shorter than the timer (T),
at least one unenhanced wake-up signal being received from the at least one terminal device before expiry of the wait timer (T1),
further enhanced wake-up signals being received before the expiry of the wait timer (T1), and
a user terminal buffer status flag being turned on in the enhanced wake-up signal; and
transmit, to the at least one terminal device, a response to the at least one enhanced wake-up signal, wherein the response indicates that the apparatus is active.

2. The apparatus claim 1, being caused to
decide, by the wake-up receiver, not to wake-up the apparatus from the network energy saving mode
in response to a number of enhanced wake-up signals received before expiry of the wait timer (T1) not being above a threshold number,
in response to no unenhanced wake-up signal being received from at least one terminal device (UE) before the expiry of the wait timer (T1),
in response to no further enhanced wake-up signals being received before expiry of the wait timer (T1), or
in response to a user terminal buffer status flag not being turned on in the enhanced wake-up signal.

3. The apparatus according to claim 1, wherein a full device buffer status, or at least as high as a queue bit threshold, indicated by the device in the enhanced wake-up signal, indicates a possibility of data loss.

4. A device comprising:
at least one processor, and at least one memory storing instructions that, when executed by the at least one processor, cause the device at least to:
transmit an enhanced wake-up signal to a wake-up receiver of a network node;
based on the transmitting, set up a timer (T), wherein the timer (T) indicates a time period within which an enhanced wake-up signal response is to be received from the wake-up receiver;
the device being caused to indicate, in the enhanced wake-up signal, a full device buffer status, or at least as high as a queue bit threshold, to indicate a possibility of data loss; and
receive, from the wake-up receiver, the enhanced wake-up signal response indicating that the network node is active in response to:
a number of enhanced wake-up signals received by the wake-up receiver before expiry of a wait timer (T1) being above a threshold number, wherein the wait timer (T1) is shorter than the timer (T),
at least one unenhanced wake-up signal being received by the wake-up receiver from the at least one terminal device before expiry of the wait timer (T1), and
further enhanced wake-up signals being received by the wake-up receiver before the expiry of the wait timer (T1).

5. The device according to claim 4, being caused to
set up the timer (T) based on a configuration determined by the network node for the device.

6. The device according to claim 4, wherein
the enhanced wake-up signal includes a device buffer status flag to indicate to the network node a device buffer status,
the device being caused to
indicate at least as high as the queue bit threshold or full device buffer status by turning on the device buffer status flag, and/or
indicate a device buffer status lower than the queue bit threshold by turning off the device buffer status flag.

7. A method comprising:
transmitting, by a device to a wake-up receiver of a network node, an enhanced wake-up signal;
based on the transmitting, setting up a timer (T), wherein the timer (T) indicates a time period within which an enhanced wake-up signal response is to be received by the device from the wake-up receiver;
indicating, by the device, in the enhanced wake-up signal, a full device buffer status, or at least as high as a queue bit threshold, to indicate a possibility of data loss; and
receiving, from the wake-up receiver, the enhanced wake-up signal response indicating that the network node is active in response to:
a number of enhanced wake-up signals received by the wake-up receiver before expiry of a wait timer (T1) being above a threshold number, wherein the wait timer (T1) is shorter than the timer (T),
at least one unenhanced wake-up signal being received by the wake-up receiver from the at least one terminal device before expiry of the wait timer (T1), and
further enhanced wake-up signals being received by the wake-up receiver before the expiry of the wait timer (T1).

8. The method according to claim 7, comprising setting up the timer (T) based on a configuration determined by the network node for the device.

9. The method according to claim 7, wherein
the enhanced wake-up signal includes a device buffer status flag to indicate to the network node a device buffer status, the method comprising indicating at least as high as the queue bit threshold or full device buffer status by turning on the device buffer status flag, and/or indicating a device buffer status lower than the queue bit threshold by turning off the device buffer status flag.

\* \* \* \* \*